United States Patent Office 2,728,985
Patented Jan. 3, 1956

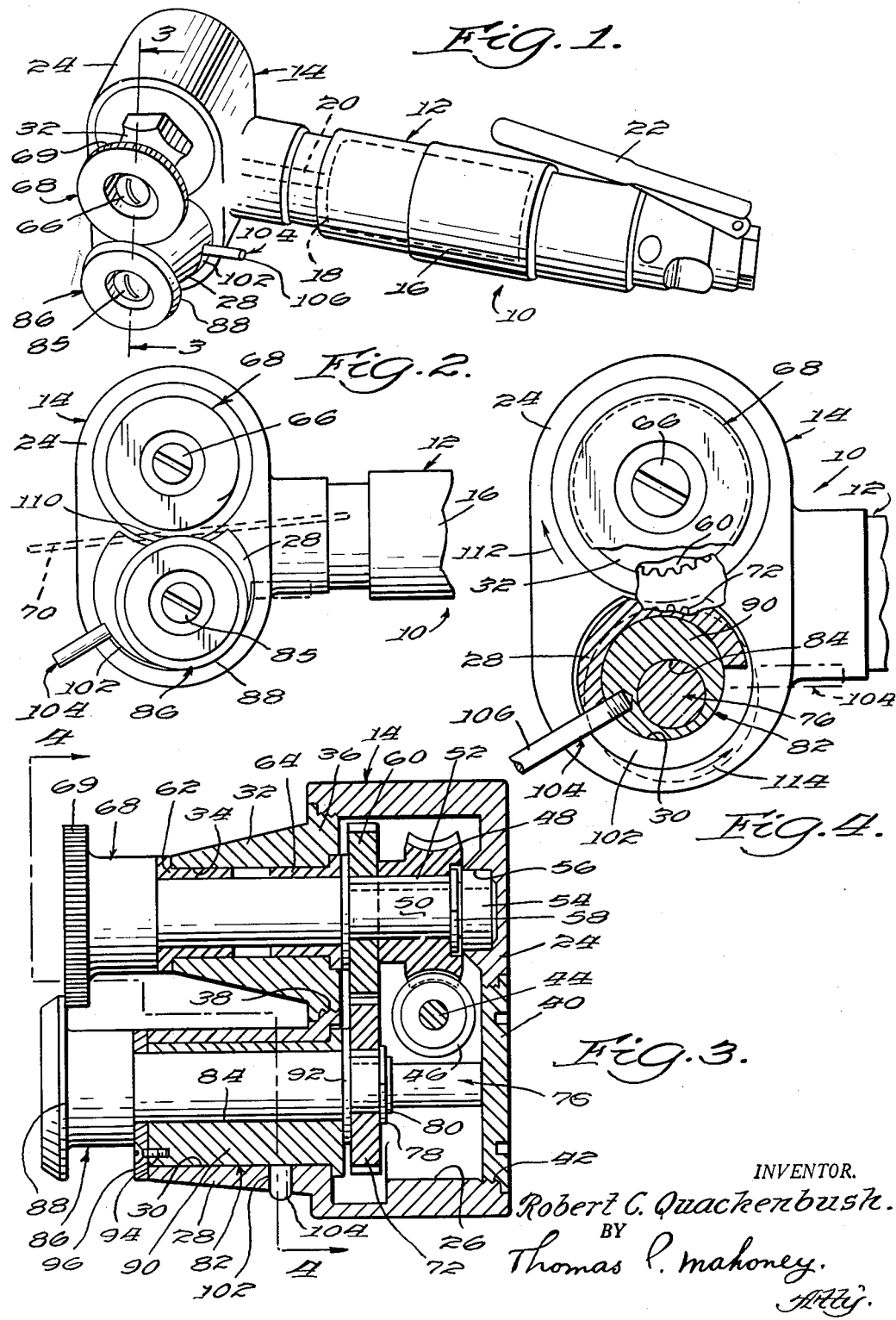

2,728,985
ADJUSTABLE ROTARY SHEARS

Robert C. Quackenbush, San Fernando, Calif.

Application December 27, 1954, Serial No. 477,783

4 Claims. (Cl. 30—265)

This invention relates to trim shears for cutting sheet metal and, more particularly, to trim shears of the rotary type wherein a pair of rotary cutters having overlapping edges is utilized to trim or cut sheet metal.

One of the major disadvantages of trim shears of the rotary type wherein the rotary cutters are disposed in overlapping relationship is the fact that such trim shears cannot be utilized to make internal cuts since the sheet metal cannot be fitted between the overlapping edges of the rotary cutters thereof. If it is desired to make internal cuts with such rotary shears, it is, of course, necessary to make a cut through the edge of the sheet to the place at which the internal cut is to be made. This limitation considerably restricts the field of application of rotary trim shears of conventional character and necessitates the use of other types of tools to form internal openings and cuts in sheet metal. This is particularly a problem in the aircraft industry where large quantities of sheet aluminum are utilized and wherein internal openings must frequently be formed for use as access openings, windows, and the like.

It is, therefore, an object of my invention to provide a rotary trim shears wherein the peripheral edges of the rotary cutters are disposed in overlapping relationship during a cutting operation, but which is provided with means for permitting one of the cutters to be moved laterally with respect to the other cutter to create a gap between the edges of the cutters into which a piece of sheet metal can be inserted so that the rotary cutters can be moved inwardly onto the body of the piece of sheet metal without making an initial edge cut to reach the portion of the sheet metal which is to be cut.

Another object of my invention is the provision of a rotary shears of the aforementioned character which includes a carrier for one of the rotary cutters which can be actuated to bodily shift said one cutter laterally with respect to its associated cutter to space the peripheral edges of the cutters of the rotary shears with respect to each other so that the sheet metal work piece can be inserted therebetween.

Another object of my invention is the provision of a rotary shears of the aforementioned character which includes a pair of rotary cutters whose peripheral edges are normally disposed in overlapping relationship to permit said edges to cut a piece of sheet metal inserted therebetween. One of the cutters is mounted upon a shaft in a carrier so that, upon the actuation of the carrier, the shaft and cutter are moved bodily with respect to the associated cutter to space the peripheral edges of the cutters away from each other to create a gap sufficient for the insertion of a piece of sheet metal therebetween.

A further object of my invention is the provision of a rotary shears of the aforementioned character wherein the carrier is constituted by a rotatable bushing mounted in the housing of the rotary shears and encompassing the shaft upon which the cutter to be moved is mounted so that as the bushing is rotated the cutter will be carried away from its associated cutter to create a space between the peripheral edges of the cutters of the shears.

Other objects and advantages of my invention will be apparent from the following specification and the accompanying drawing which is for the purpose of illustration only and in which:

Fig. 1 is a perspective view showing a rotary shears constructed in accordance with the teachings of my invention;

Fig. 2 is an enlarged fragmentary bottom plan view showing the rotary cutters of the shears disposed with their lateral edges in spaced relationship with each other to permit the insertion of a piece of sheet metal between said edges;

Fig. 3 is an enlarged, vertical sectional view taken on the broken line 3—3 of Fig. 1; and Fig. 4 is a vertical sectional view taken on the broken line 4—4 of Fig. 3.

Referring to the drawing and particularly to Fig. 1 thereof, I show a rotary shears 10 the operative parts of which are incorporated in a housing 12. The housing 12 is provided at the forward end thereof with a shear head 14 demountable from the remainder of the housing and of substantially elliptical configuration with the axis of the ellipse extending normal to the axis of the body 16 of the housing 12.

Disposed within the body 16 of the housing 12, as indicated by the dash line, is a motor 18 which, through appropriate gearing, not shown, energizes a drive shaft 20. The energization of the motor 18 which, in the present instance, happens to be a pneumatic motor, is controlled by a valve lever 22.

The elliptical body 24 of the shear head 14 defines a chamber 26, said body having a laterally extending boss 28 formed integrally therewith and provided with a bore 30 communicating with the interior of said chamber, as best shown in Figs. 3 and 4 of the drawings. A second boss 32 extending laterally from the body 24 in parallelism with the boss 28 is provided with a bore 34 which also communicates with the chamber 26. To facilitate the assembly of the shear head 14, the second boss is provided with a threaded base 36 which is located in a correspondingly threaded opening 38 provided in the body 24 of the shear head 14. A rear cover 40 is threadedly engaged in a rear opening 42 to close the chamber 26 and to permit access to be had to the component parts of the shear head 14 disposed within said chamber.

Extending into the chamber 26 with its axis oriented perpendicularly to the axes of the bosses 28 and 32 is a main drive shaft 44 which is connected, in a manner not shown, to the drive shaft 20 of the motor 18 to provide motive power for the shear head 14. Mounted for rotation on the main drive shaft 44 is a worm gear 46 which is in mesh with a worm wheel 48 mounted upon the lower extremity of a drive shaft 50 and keyed thereto by means of a key 52. The end of the drive shaft 50 adjacent the worm wheel 48 is journaled in a needle bearing 54 located in a cavity 56 provided in a wall of the member 26 and a spring retainer 58 encompasses said shaft adjacent the bearing to maintain the worm wheel 48 in juxtaposition to a drive spur gear 60 which is also keyed to the drive shaft 50 by means of the key 52.

The drive shaft 50 extends outwardly into the bore 34 of the boss 32 and is journaled in longitudinally spaced bushings 62 and 64, the bushing 62 being provided with a flange overlying the outermost end of the boss 32 and the bushing 64 having a flange located in a recess at the end of the bore 34. Mounted on the outer extremity of the shaft 50 by means of a screw 66 is a rotatable feed cutter 68, the periphery of said cutter being provided with serrations 69 for gripping the contiguous surface on a work piece 70 formed from sheet metal to cause the shear head 14 to traverse the surface of said work piece. Therefore, when the motor 18 is energized, the main drive shaft 44 will be rotated to cause concomitant rotation of the worm gear 46.

The rotation of the worm gear 46 will be imparted to the worm wheel 48 to cause concomitant rotation of the drive shaft 50 and the rotatable feed cutter 68 mounted thereupon. The rotation of the drive shaft 50 also causes rotation of the drive spur gear 60 which is in mesh with a driven spur gear 72. The driven spur gear 72 is located upon a driven shaft 76 by means of a snap ring 78 which abuts on a shoulder 80 formed integrally with said shaft.

The outer extremity of the driven shaft 76 extends through the bore 30 in the boss 28 and is mounted for both rotary and lateral movement in an elongated carrier 82 which is provided with a bore 84 in which the driven shaft 76 is journaled. The carrier 82 is located in the bore 30 of the boss 28 and serves as a bushing for the driven shaft 76. Secured to the outer end of the driven shaft 76 by means of a screw 85 is a roll cutter 86 whose cutting edge 88 is disposed in overlapping relationship with the cutting edge of the feed cutter 68 when said cutters are in operating position.

The carrier 82 is constituted by an elongated bushing 90 having an integral flange 92 formed upon the lower end thereof which impinges on a contiguous portion of the inner wall of the chamber 26 to prevent axial movement thereof and which has secured to the upper end thereof, as by means of screws 94, a retainer plate 96, said plate being adapted to prevent axial movement of the bushing 90 in an inward direction. The axial bore 84 is, as best shown in Figs. 3 and 4 of the drawing, located eccentrically with respect to the axis of the bushing 90 constituting the carrier 82.

A radial slot 102 is formed in the wall of the boss 28 and a control member 104 for the carrier 82 extends therethrough. The control member 104 is constituted by a pin 106 threaded into the body of the carrier 82 and is intended to permit the carrier 82 to be rotated in the bore 30 of the boss 28.

The operation of the rotary shears 10 is as follows:
When the rotary shears is to be utilized in cutting a work piece 70 constituted by a piece of sheet metal in the conventional manner, the feed and roll cutters 68 and 86 are simply applied to the edge of the sheet, the control lever 22 depressed and the serrations 69 will grip upon the surface of the sheet metal and cause the shears 10 to traverse the sheet metal in a path determined by the control exerted on the shears by the operator thereof.

However, if it is desired to cut the work piece 70 at a point remote from the edge thereof, the control member 104 is grasped and shifted from the right-hand position shown in dot-dash lines 104 in Fig. 4 of the drawing to the left-hand position shown in full lines in the same figure. The limits of movement of the control member 104 are determined by the opposite ends of the slot 102 and, as the control member 104 is moved from the right-hand to the left-hand end of the slot, the elongated bushing 90 constituting the carrier 82 is rotated in the bore 30 of the boss 28 about its axis thus, by virtue of the eccentric location of the driven shaft 76 in the bore 84 of said bushing, causing the driven shaft 76 to be moved bodily and laterally away from the drive shaft 50. When such outward movement of the shaft 76 takes place, the roll cutter 86 is carried outwardly on the driven shaft 76 into the position shown in Figs. 2 and 4 of the drawing wherein a gap 110 is shown as existing between the cutting edges of the feed cutter 68 and the roll cutter 86 so that the work piece 70 can be inserted therebetween or so that the cutters 68 and 86 can be fitted over a work piece and moved into the desired position at a point remote from the edge.

After the shears 10 is located in the desired position, the control member 104 is rotated in a counterclockwise direction to the right-hand end of the slot 102 to move the cutting edges of the cutters 68 and 86 into overlapping relationship and to bring the drive spur gear 60 and the driven spur gear 72 into mesh once again. The control lever 22 is then depressed to energize the motor 18 and the cutting action of the cutters 68 and is initiated.

It will be noted that, as best shown in Fig. 4 of the drawing, the drive spur gear 60 is driven in a clockwise direction as indicated by the arrow 112 while the driven spur gear 72 is driven in a counterclockwise direction thereby as indicated by the arrow 114. Since the driven spur gear 72 rotates in the bushing 90 constituting the carrier 82, the rotation of the driven shaft 76 tends to urge the bushing in the counterclockwise direction and to maintain the control member 104 in the right-hand end of the slot to maintain the gears 60 and 72 in mesh and to maintain the cutters 68 and 86 in overlapping relationship.

After the internal cut in the work piece 70 has been completed and it is desired to remove the shears 10 without cutting to the edge of the work piece, it is only necessary to rotate the control member 104 to the right-hand end of the slot 102 as shown in Fig. 4 of the drawing to rotate the carrier 82 and thus, once again, create the gap 110 between the cutters 68 and 86. This will release the cutters from overlapping relationship with each other and permit the shears 10 to be removed to the edge of the work piece and freed therefrom without the necessity of cutting out to said edge as is necessary with conventional shears.

I thus provide by my invention a rotary shears which can be used to cut a sheet metal work piece internally at a point removed from the edge of the work piece without the necessity of cutting inwardly from the edge to reach the internal point which must be cut. This desired end is achieved by the provision of carrier means adapted to move one cutter with respect to the other so that a gap is created between the normally overlapping edges of the cutters to permit the shears to be fitted over the work piece at a point remote from the edge thereof without the necessity for cutting in from said edge.

I claim as my invention:
1. In a portable trim shears, the combination of: a housing, said housing having a shear head upon the outer end thereof and said head having first and second bosses extending outwardly therefrom on parallel axes normal to the axis of said housing, said bosses having bores in the interior thereof; a motor in said housing; a motor driven shaft in the bore of said first boss; a first cutter mounted in said head for rotation on said motor-driven shaft; a second shaft driven by said motor driven shaft and located in the bore of said second boss; a second cutter mounted for rotation on said second shaft, said first and second cutters having their peripheral edges disposed in overlapping relationship during a cutting operation; and a carrier mounted in said second boss and supporting said second shaft to move said second cutter away from said first cutter, said carrier being constituted by an elongated bushing mounted in said bore of second boss and having an eccentrically located bore for the reception of said second shaft.

2. In a portable trim shears, the combination of: a housing, said housing having a shear head upon the outer end thereof and said head having first and second bosses extending outwardly therefrom on parallel axes normal to the axis of said housing, said bosses having bores in the interiors thereof, said second boss having an opening in its wall communicating with the bore therein; a motor in said housing; a motor driven drive shaft in the bore of said first boss; a first cutter mounted in said head for rotation on said motor driven drive shaft; a second shaft driven by said motor driven shaft and located in the bore of said second boss; a second cutter mounted for rotation on said second shaft, said first and second cutters having their peripheral edges disposed in overlapping relationship during a cutting operation; a carrier mounted in said second boss and supporting said second shaft to move said second cutter away from said first cutter, said carrier being constituted by an elongated bushing mounted in said bore of said second boss and having an eccentrically located bore for the reception of said second shaft; and a control on said second boss for moving said carrier to shift said second shaft away from said motor driven shaft, said control being constituted by a radially extending member connected to said bushing and projecting through said opening in said second boss.

3. In a portable trim shears, the combination of: a housing, said housing having a shear head upon the outer end thereof and said head having first and second bosses extending outwardly therefrom on parallel axes normal to the axis of said housing, said bosses having bores in the interior thereof; a motor driven shaft in the bore of said first boss; a motor in said housing driving a worm extending axially into said shear head and engaged by a worm gear on said motor driven shaft; a first cutter mounted for rotation on said motor driven drive shaft; a second shaft driven by said motor driven shaft and located in the bore of said second boss, said motor driven shaft and said second shaft having entrained gears thereupon; a second cutter mounted in said head for rotation on said second shaft, said first and second cutters having their peripheral edges disposed in overlapping relationship during a cutting operation; and a carrier mounted in said second boss and supporting said motor driven shaft to move said second cutter away from said first cutter, said carrier being constituted by an elongated bushing mounted in said bore of said second boss and having an eccentrically located bore for the reception of said second shaft.

4. In a portable trim shears, the combination of: a housing, said housing having a shear head upon the outer end thereof and said head having first and second bosses extending outwardly therefrom on parallel axes normal to the axis of said housing, said bosses having bores in the interior thereof, said second boss having an opening in its wall communicating with the bore therein; a motor driven shaft in the bore of said first boss; a motor in said housing driving a worm extending axially into said shear head and engaged by a worm gear on said motor driven shaft; a first cutter mounted for rotation on said motor driven drive shaft; a second shaft driven by said motor driven shaft and located in the bore of said second boss, said motor driven shaft and said second shaft having entrained gears thereupon; a second cutter mounted in said head for rotation on said second shaft, said first and second cutters having their peripheral edges disposed in overlapping relationship during a cutting operation; a carrier mounted in said second boss and supporting said motor driven shaft to move said second cutter away from said first cutter, said carrier being constituted by an elongated bushing mounted in said bore of said second boss and having an eccentrically located bore for the reception of said second shaft; and a control on said boss for moving said bushing to shift said second shaft away from said motor driven shaft, said control being constituted by a radially extending member connected to said bushing and projecting through said opening in said second boss.

References Cited in the file of this patent

UNITED STATES PATENTS

| | | |
|---|---|---|
| 1,508,869 | Astrup | Sept. 16, 1924 |
| 1,986,870 | West | Jan. 8, 1935 |
| 2,255,641 | Arnesen | Sept. 9, 1941 |
| 2,570,195 | Bird et al. | Oct. 9, 1951 |